No. 854,469. PATENTED MAY 21, 1907.
H. CRUSE.
CONSTRUCTION OF VALVE CASINGS.
APPLICATION FILED JUNE 14, 1906.
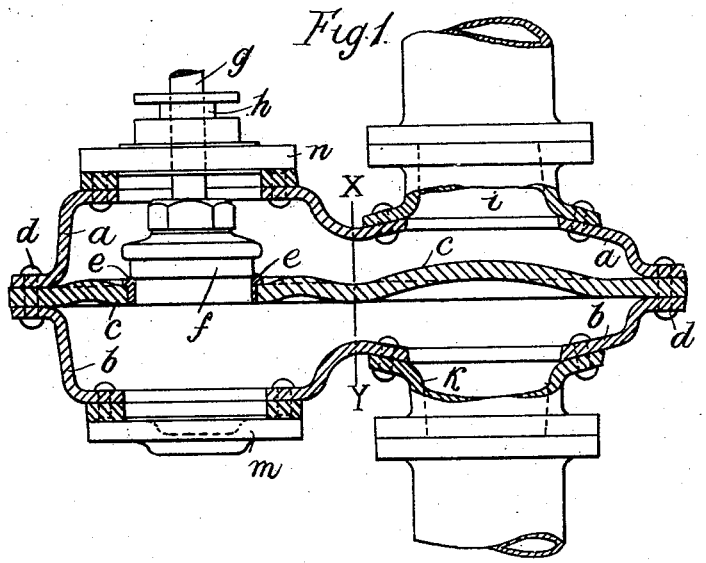
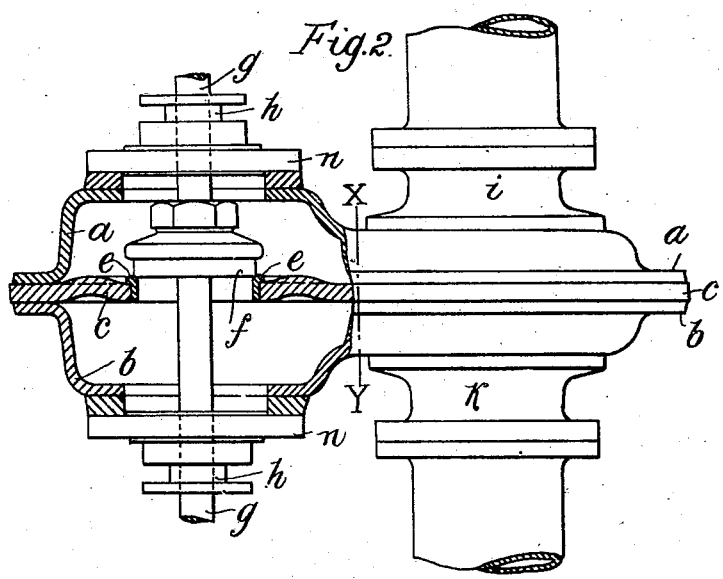
WITNESSES
INVENTOR
Henry Cruse
By Richardson
ATT'YS

UNITED STATES PATENT OFFICE.

HENRY CRUSE, OF BLACKLEY, NEAR MANCHESTER, ENGLAND.

CONSTRUCTION OF VALVE-CASINGS.

No. 854,469.     Specification of Letters Patent.     Patented May 21, 1907.

Application filed June 14, 1906. Serial No. 321,693.

*To all whom it may concern:*

Be it known that I, HENRY CRUSE, a subject of Great Britain, residing at 16 and 18 Charlestown, Blackley, near Manchester, in the county of Lancaster, England, have invented new and useful Improvements in the Construction of Valve-Casings, of which the following is a specification.

My invention relates to improvements in the construction of valve casings and is applicable to the casings of stop valves, check valves, reducing valves, as well as to junction and various other forms of valves.

In carrying my improvements into effect I form the valve casing of two pressed, stamped or wrought dishes of wrought iron or steel, divided into two compartments or chambers by a diaphragm also of wrought metal. These three parts are united by bolts or rivets passing through the flanges or edges of the dishes as well as through the intermediate diaphragm which thus forms a calking plate. The valve seating is formed in the diaphragm so that one compartment forms the inlet chamber and the other the outlet of the valve casing. The valve is suitably mounted on a spindle which passes through glands fixed in the outer walls of both chambers or through a single gland fixed upon either wall. Access is had to the valve casing to permit the insertion and withdrawal of the valve through an orifice in the shell opposite the valve seating in the diaphragm and this orifice in the shell is covered by a wrought metal plate suitably secured to the casing.

In the accompanying drawings—Figures 1 and 2 are sectional elevations of two of my improved valve casings.

In Fig. 1,—the valve spindle is shown passing through a single gland or stuffing box while in Fig. 2 the valve spindle passes through two glands, one upon either wall. In these views.—$a$ and $b$ designate the two pressed, stamped or wrought dishes of wrought iron or steel; $c$ designates the wrought metal diaphragm; $d$ bolts or rivets passing through the edges of the parts $a$, $b$, $c$, to secure them together; $e$ the valve seating formed in and on the diaphragm; $f$ the valve; $g$ the valve spindle which in Fig. 1 passes through one gland $h$ but in Fig. 2 is shown passing through two glands $h$ fixed in the outer walls of the two chambers into which the casing is divided by the diaphragm; $i$ the inlet and $k$ the outlet or vice versa; $m$ the wrought metal plate covering the access orifice in the casing opposite the valve seating, and interchangeable with the corresponding plate $n$ which carries the gland $h$.

It will be obvious that in this construction ready access can be had to the valve without disturbing the pipe line, as the valve casing in addition to being divided into two chambers horizontally by the diaphragm is also practically divided into two chambers vertically by the imaginary line X—Y, one such chamber being in the direct line of the piping and having the diaphragm solid in that line, and the other chamber having access orifices both above and below the valve $f$ which has its seating $e$ in the diaphragm. Another advantage in having the valve chamber out of the direct pipe line is that the valve, valve seating and valve spindle are unaffected by any expansion or contraction in the piping and the right hand chamber of the valve casing thus acts as an expansion chamber.

I am aware that it has previously been proposed to construct valve casings with pressings or stampings of metals and to employ a diaphragm of wrought metal placed obliquely therein, and I therefore wish it to be clearly understood that my claim is limited to the particular construction herein shown and described.

What I claim and desire to secure by Letters Patent of the United States is:—

1. A valve casing comprising two dish shaped metal parts, $a$, $b$, and an intermediate metal diaphragm bolted together and forming two chambers, each of said dish shaped parts having an opening therein adjacent one end of the casing and the diaphragm having an opening therein adjacent the other end, a valve seating surrounding said opening, and a valve coöperating with said seating.

2. A valve casing comprising two dish-shaped metal parts, and an intermediate metal diaphragm bolted together, and forming two chambers, each of said dish-shaped parts having two openings therein, an inlet pipe leading to one opening in one part and outlet pipe connected to the corresponding opening in the other part, said diaphragm having an opening therein, a valve closing said opening and having its stem projecting through the remaining pair of openings in the dish-shaped parts and glands covering said openings.

In testimony whereof I have signed my name to this specification in the presence of two subscribing witnesses.

HENRY CRUSE.

Witnesses:
S. W. GILLETT,
HERBERT R. ABBEY.